United States Patent
Tu et al.

(10) Patent No.: US 11,561,346 B2
(45) Date of Patent: Jan. 24, 2023

(54) TUNABLE ECHELLE GRATING

(71) Applicant: Apple Inc., Cupertino, CA (US)

(72) Inventors: Yongming Tu, Redwood City, CA (US); Alfredo Bismuto, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/386,297

(22) Filed: Jul. 27, 2021

(65) Prior Publication Data
US 2022/0091338 A1    Mar. 24, 2022

Related U.S. Application Data

(60) Provisional application No. 63/082,955, filed on Sep. 24, 2020.

(51) Int. Cl.
*G02B 6/12* (2006.01)
*G02B 6/293* (2006.01)
*G02B 6/124* (2006.01)

(52) U.S. Cl.
CPC ......... *G02B 6/29308* (2013.01); *G02B 6/124* (2013.01); *G02B 6/12007* (2013.01);
(Continued)

(58) Field of Classification Search
CPC ............ G02B 6/29308; G02B 6/12014; G02B 6/12016; G02B 6/124; G02B 6/29328;
(Continued)

(56) References Cited

U.S. PATENT DOCUMENTS

| 5,287,376 A | 2/1994 | Paoli |
| 5,488,678 A | 1/1996 | Taneya |

(Continued)

FOREIGN PATENT DOCUMENTS

| EP | 1403985 | 3/2004 |
| EP | 1432045 | 6/2004 |

(Continued)

OTHER PUBLICATIONS

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

(Continued)

*Primary Examiner* — Ryan A Lepisto
*Assistant Examiner* — Erin D Chiem
(74) *Attorney, Agent, or Firm* — Brownstein Hyatt Farber Schreck, LLP

(57) ABSTRACT

Configurations for a tunable Echelle grating are disclosed. The tunable Echelle grating may include an output waveguide centered in a waveguide array, with input waveguides on both sides of the output waveguide. A metal tuning pad may be located over the slab waveguide and may be heated to induce a temperature change in the slab waveguide. By increasing the temperature of the propagation region of the slab waveguide, the index of refraction may shift, thus causing the peak wavelength of the channel to shift. This may result in an optical component capable of multiplexing multiple light sources in an energy efficient manner while maintaining a small form factor.

16 Claims, 9 Drawing Sheets

(52) U.S. Cl.
CPC ..... *G02B 6/12014* (2013.01); *G02B 6/12016* (2013.01); *G02B 6/29326* (2013.01); *G02B 6/29328* (2013.01); *G02B 6/29395* (2013.01)

(58) Field of Classification Search
CPC ............ G02B 6/29326; G02B 6/29395; G02B 6/12007
See application file for complete search history.

(56) References Cited

U.S. PATENT DOCUMENTS

| | | | |
|---|---|---|---|
| 5,644,667 A | 7/1997 | Tabuchi | |
| 5,708,674 A | 1/1998 | Berrnink | |
| 5,742,631 A | 4/1998 | Paoli | |
| 5,818,989 A | 10/1998 | Nakamura | |
| 5,850,411 A | 12/1998 | Major, Jr. | |
| 5,915,165 A | 6/1999 | Sun | |
| 6,122,042 A | 9/2000 | Wunderman et al. | |
| 6,330,378 B1 | 12/2001 | Forrest | |
| 6,393,185 B1 | 5/2002 | Deacon | |
| 6,415,080 B1 | 7/2002 | Sappey et al. | |
| 6,594,409 B2 | 7/2003 | Dutt et al. | |
| 6,628,686 B1 | 9/2003 | Sargent | |
| 6,657,723 B2 | 12/2003 | Cohen | |
| 6,795,622 B2 | 9/2004 | Forrest | |
| 6,803,604 B2 | 10/2004 | Takahashi et al. | |
| 6,892,449 B1 | 5/2005 | Brophy et al. | |
| 6,940,182 B2 | 9/2005 | Hilton et al. | |
| 6,947,639 B2 | 9/2005 | Singh | |
| 6,952,504 B2 | 10/2005 | Bi | |
| 6,954,568 B2 | 10/2005 | Liu | |
| 6,987,906 B2 | 1/2006 | Nakama et al. | |
| 7,054,517 B2 | 5/2006 | Mossberg | |
| 7,058,245 B2 | 6/2006 | Farahi | |
| 7,079,715 B2 | 7/2006 | Kish | |
| 7,149,387 B2 | 12/2006 | Balakrishnan et al. | |
| 7,151,635 B2 | 12/2006 | Bidnyk et al. | |
| 7,189,011 B2 | 3/2007 | Harker | |
| 7,203,401 B2 | 4/2007 | Mossberg | |
| 7,203,426 B2 | 4/2007 | Wu et al. | |
| 7,209,611 B2 | 4/2007 | Joyner | |
| 7,245,379 B2 | 7/2007 | Schwabe | |
| 7,283,694 B2 | 10/2007 | Welch | |
| 7,314,451 B2 | 1/2008 | Halperin et al. | |
| 7,324,195 B2 | 1/2008 | Packirisamy et al. | |
| 7,327,918 B2 | 2/2008 | Yamazaki et al. | |
| 7,366,364 B2 | 4/2008 | Singh | |
| 7,447,393 B2 | 11/2008 | Yan | |
| 7,460,742 B2 | 12/2008 | Joyner | |
| 7,477,384 B2 | 1/2009 | Schwabe | |
| 7,483,599 B2 | 1/2009 | Dominic et al. | |
| 7,526,007 B2 | 4/2009 | Chua et al. | |
| 7,558,301 B2 | 7/2009 | Lin et al. | |
| 7,680,364 B2 | 3/2010 | Nilsson | |
| 7,720,328 B2 | 5/2010 | Yan | |
| 7,885,302 B2 | 2/2011 | Eberhard | |
| 7,885,492 B2 | 2/2011 | Welch | |
| 7,974,504 B2 | 7/2011 | Nagarajan | |
| 8,300,994 B2 | 10/2012 | Welch et al. | |
| 8,559,775 B2 | 10/2013 | Babie et al. | |
| 8,564,784 B2 | 10/2013 | Wang et al. | |
| 8,724,100 B1 | 5/2014 | Asghari et al. | |
| 8,920,332 B2 | 12/2014 | Hong et al. | |
| 8,983,250 B2 | 3/2015 | Black et al. | |
| 9,020,004 B2 | 4/2015 | Jeong | |
| 9,031,412 B2 | 5/2015 | Nagarajan | |
| 9,052,447 B2 | 6/2015 | Luo et al. | |
| 9,110,259 B1 | 8/2015 | Black | |
| 9,135,397 B2 | 9/2015 | Denyer et al. | |
| 9,176,282 B2 | 11/2015 | Pottier | |
| 9,217,669 B2 | 12/2015 | Wu et al. | |
| 9,348,154 B2 | 5/2016 | Hayakawa | |
| 9,370,689 B2 | 6/2016 | Guillama et al. | |
| 9,395,494 B2 | 7/2016 | Krishnamurthi et al. | |
| 9,405,066 B2 | 8/2016 | Mahgerefteh | |
| 9,543,736 B1 | 1/2017 | Barwicz et al. | |
| 9,620,931 B2 | 4/2017 | Tanaka | |
| 9,766,370 B2 | 9/2017 | Aloe et al. | |
| 9,804,027 B2 | 10/2017 | Fish et al. | |
| 9,829,631 B2 | 11/2017 | Lambert | |
| 9,880,352 B2 | 1/2018 | Florjanczyk | |
| 9,943,237 B2 | 4/2018 | Baker et al. | |
| 9,948,063 B2 | 4/2018 | Caneau et al. | |
| 10,009,668 B2 | 6/2018 | Liboiron-Ladouceur | |
| 10,132,996 B2 | 11/2018 | Lambert | |
| 10,238,351 B2 | 3/2019 | Halperin et al. | |
| 10,285,898 B2 | 5/2019 | Douglas et al. | |
| 10,310,196 B2 | 6/2019 | Hutchison | |
| 10,359,571 B2 | 7/2019 | North | |
| 10,429,597 B2 | 10/2019 | ten Have et al. | |
| 10,529,003 B2 | 1/2020 | Mazed | |
| 10,687,718 B2 | 6/2020 | Allee et al. | |
| 10,852,492 B1 | 12/2020 | Vermeulen et al. | |
| 11,064,592 B1 | 7/2021 | Bismuto et al. | |
| 11,231,319 B1 | 1/2022 | Tu et al. | |
| 2003/0091265 A1 | 5/2003 | Lin et al. | |
| 2004/0126117 A1 | 7/2004 | Lo et al. | |
| 2005/0053112 A1 | 3/2005 | Shams-Zadeh-Amiri | |
| 2005/0063431 A1 | 3/2005 | Gallup et al. | |
| 2006/0002443 A1 | 1/2006 | Farber et al. | |
| 2008/0044128 A1 | 2/2008 | Kish et al. | |
| 2008/0310470 A1 | 12/2008 | Ooi et al. | |
| 2012/0002924 A1 | 1/2012 | Okayama | |
| 2014/0029943 A1 | 1/2014 | Mathai et al. | |
| 2014/0233891 A1* | 8/2014 | Pottier ............... G02B 6/12007 359/570 |
| 2016/0224750 A1 | 8/2016 | Kethman et al. | |
| 2017/0164878 A1 | 6/2017 | Connor | |
| 2019/0052063 A1* | 2/2019 | Tolstikhin ........... H01S 5/06808 |
| 2019/0339468 A1 | 11/2019 | Evans | |
| 2019/0342009 A1 | 11/2019 | Evans | |
| 2020/0152615 A1 | 5/2020 | Krasulick et al. | |
| 2020/0244045 A1 | 7/2020 | Bismuto et al. | |
| 2020/0253547 A1 | 8/2020 | Harris et al. | |
| 2020/0309593 A1 | 10/2020 | Bismuto et al. | |
| 2021/0033805 A1 | 2/2021 | Bishop et al. | |
| 2021/0199576 A1 | 7/2021 | Arbore et al. | |
| 2022/0099889 A1 | 3/2022 | Arbore et al. | |

FOREIGN PATENT DOCUMENTS

| | | |
|---|---|---|
| JP | H04204508 | 7/1992 |
| JP | H063709 | 1/1994 |
| JP | 2007279240 | 10/2007 |
| JP | 2008262118 | 10/2008 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

Kybartas et al., "Capacitive Sensor for Respiratory Monitoring," Conference "Biomedical Engineering," Nov. 2015, 6 pages.
Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.
Materials and Processes for Electronic Applications, Series Editor: James J. Licari, AvanTeco, Whittier, California, Elsevier Inc., 2009, 20 pages.
Worhoff et al., "Flip-chip assembly for photonic circuits," MESA+ Research Institute, University of Twente, Integrated Optical MicroSystems Group, The Netherlands, 12 pages.
International Search Report and Written Opinion dated Dec. 23, 2021, PCT/US2021/046359, 12 pages.

(56) References Cited

OTHER PUBLICATIONS

He et al., "Integrated Polarization Compensator for WDM Waveguide Demultiplexers," *IEEE Photonics Technology Letters* vol. 11, No. 2, Feb. 1999, pp. 224-226.
Krubhakar et al., "Design and fabrication of integrated optical 1x8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.
U.S. Appl. No. 17/725,418, filed Apr. 20, 2022, Wu et al.
U.S. Appl. No. 17/832,091, filed Jun. 3, 2022, Wu.
U.S. Appl. No. 17/851,252, filed Jun. 28, 2022, Wu.
U.S. Appl. No. 17/254,810, filed Dec. 21, 2020, Bishop et al.
U.S. Appl. No. 17/373,167, filed Jul. 12, 2021, Bismuto et al.
U.S. Appl. No. 17/379,759, filed Jul. 19, 2021, Lee et al.
U.S. Appl. No. 17/014,902, filed Sep. 8, 2020, Tu et al.
U.S. Appl. No. 17/073,393, filed Oct. 18, 2020, Wu et al.

\* cited by examiner

TUNABLE ECHELLE GRATING

CROSS-REFERENCE TO RELATED APPLICATION

This application is a nonprovisional of and claims the benefit under 35 U.S.C. § 119(e) of U.S. Provisional Patent Application 63/082,955, filed Sep. 24, 2020, the contents of which are incorporated herein by reference as if fully disclosed herein.

FIELD

This disclosure relates generally to an optical system with emitting and receiving light sources, waveguides, and an Echelle grating. More particularly, embodiments herein relate to an optical system for multiplexing multiple light sources via emitting and receiving waveguides and a tunable Echelle grating.

BACKGROUND

Generally, optical systems may employ multiple light sources for measuring various types of information used in everyday devices. Optical couplers and/or Echelle gratings may be used in these optical systems to couple or multiplex the light together. Optical couplers are effective at combining light, but the size of the optical system may increase to an unreasonable size as the optical systems using optical couplers tend to increase in scale with the number of light sources. Additionally, some of these large optical coupling devices are not energy efficient and may introduce phase errors into the optical system. Echelle gratings also may be employed in optical systems but can be large and wavelength dependent. Typically, Echelle gratings multiplex light within a defined passband and although the gratings may have a reasonably wide spectral range, the size may increase with the passband size.

SUMMARY

Embodiments of the systems, devices, methods, and apparatuses described in the present disclosure are directed to a photonics device for de-multiplexing light. Also described are systems, devices, methods, and apparatuses directed to receiving light in a wavelength range and outputting light in a first wavelength range of light and a second wavelength range of light, which may be separated by at least 0.1 µm. An input waveguide may provide the light through a slab waveguide and reflect off of a diffraction grating, as a first output light received by a first output waveguide and a second output light received by a second output waveguide. The input waveguide may be positioned between the first and second output waveguides.

In some examples, the present disclosure describes an optical component. The optical component may include a slab waveguide defining a first input light path and a second input light path, a first input waveguide configured to emit a first light along the first input light path in the slab waveguide, a second input waveguide configured to emit a second light along the second input light path in the slab waveguide, and a set of grating facets configured to receive the first light from the first input waveguide and the second light from the second input waveguide and reflect the emitted first light as a first reflected light and the emitted second light as a second reflected light. In some examples, the optical component may include an output waveguide defining a first reflected light path and configured to receive the first reflected light along the first reflected light path and from the slab waveguide and a tuning pad disposed on the slab waveguide and operable to adjust a temperature of the slab waveguide. In some examples, the output waveguide is located between the first input waveguide and the second input waveguide, and the slab waveguide may include a first cladding layer disposed on a substrate, a propagation region disposed on the first cladding layer, and a second cladding layer disposed on the propagation region. In some examples, the tuning pad is configured to heat the propagation region of the slab waveguide, thereby shifting an index of refraction of the propagation region to change a peak wavelength of a corresponding channel.

In some examples, the first emitted light and the second emitted light is in a broadband wavelength range spanning at least one µm. In some examples, the first reflected light is in a first wavelength range and the second reflected light is in a second wavelength range spaced apart from the first wavelength range by at least 0.1 µm. In some examples, the tuning pad is configured to shift a peak wavelength of a corresponding channel and the peak wavelength shift is shifted 50 nanometers or less. In some examples, the tuning pad is configured to shift an index of refraction by 0.04 or less. In some examples, the optical component may include a light path having a path length between the output waveguide and the set of grating facets and a change in path length is inversely related to the shift in the index of refraction for a constant shift in a wavelength of light. In some examples, the tuning pad tunes a peak wavelength of a corresponding channel that is spaced apart from an adjacent channel by 50 nanometers. In some examples, the optical component may include a temperature monitoring pad proximate to the tuning pad for monitoring a wavelength shift.

In some examples, the present disclosure describes an optical component. The optical component may include an input waveguide configured to provide input light along an input light path and positioned at a first location on a Rowland circle, an output waveguide configured to receive reflected light along a reflected light path and positioned at a second location on the Rowland circle, and a diffraction grating configured to receive light along the input light path of the input waveguide and reflect light along the reflected light path to the output waveguide, and a tuning pad configured to shift a peak wavelength of a channel. In some examples, the input light is a first input light, the input light path is a first input light path, the input waveguide is a first input waveguide, and the optical component may include a second input waveguide configured to provide a second input light along a second input light path and positioned at a third location on the Rowland circle, the second location on the Rowland circle between the first location and the third location on the Rowland circle and a slab waveguide through which the first input light path, the second input light path, and the reflected light path propagate. In some examples, the reflected light path is located between the first input light path and the second input light path in the slab waveguide and the tuning pad is a metal pad configured to heat a portion of the slab waveguide to shift the peak wavelength of the channel.

In some examples, the input light is a first input light, and the optical component may include a second input waveguide configured to provide a second input light along a second input light path and be positioned at a third location on the Rowland circle, the first input light includes a first wavelength range of light and the second input light includes a second wavelength range of light, and the first and second wavelength ranges of light are spaced apart by at least 0.2 microns, and the reflected light propagates in the channel in a slab waveguide. In some examples, a tuning range of the channel in the slab waveguide is 50 nanometers. In some examples, the optical component may include a second light emitting element configured to emit a second input light along a second input light path and a channel spacing between the first light emitting element and the second light emitting element is 50 nanometers. In some examples, the tuning pad is a metal tuning pad. In some examples, the optical component may include a slab waveguide that includes a first cladding layer, a propagation region disposed on the first cladding layer, and a second cladding layer disposed on the propagation region, wherein the tuning pad is disposed on the second cladding layer and configured to increase a temperature of the propagation region of the slab waveguide. In some examples, a temperature change of the propagation region of the slab waveguide is in the range of 20-25 degrees Celsius. In some examples, the optical component may include a light path with a path length between the light receiving element and the diffraction grating, where for a constant shift in a wavelength, a change in the path length is inversely related to a shift in an index of refraction induced by the tuning pad.

In some examples, the present disclosure describes a method for multiplexing light. The method may include emitting a first light, by a first input waveguide, in a first wavelength range of a broadband wavelength range, emitting a second light, by a second input waveguide, in a second wavelength range of the broadband wavelength range, the first wavelength range separated from the second wavelength range by at least 0.2 µm, reflecting the first light as a reflected light in the first wavelength range from an Echelle grating along a first channel, tuning a peak wavelength of the first channel to a first tuned wavelength, and receiving the reflected light with the first tuned wavelength at an output waveguide. In some examples, tuning the peak wavelength may include heating a slab waveguide using a tuning pad and shifting an index of refraction of the slab waveguide. In some examples, the output waveguide is positioned between the first input waveguide and the second input waveguide. In some examples, tuning the peak wavelength may include locally increasing a temperature of a slab waveguide. In some examples, the method may include monitoring a shift in the peak wavelength of the first channel using a monitoring pad.

In addition to the example aspects and embodiments described above, further aspects and embodiments will become apparent by reference to the drawings and by study of the following description.

Figure 1A:
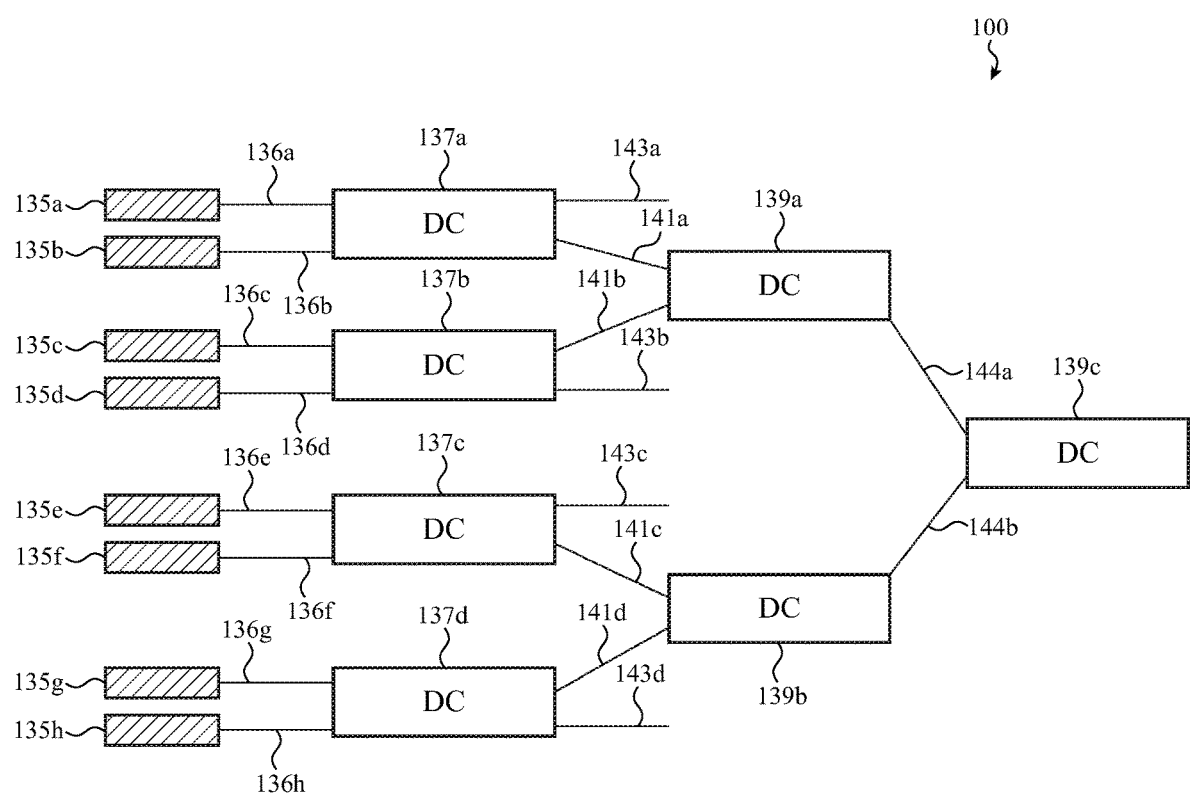
FIG. 1A illustrates a block diagram of a cascaded direct coupler optical multiplexing system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Directional terminology, such as "top", "bottom", "upper", "lower", "above", "below", "beneath", "front", "back", "over", "under", "left", "right", and so forth, is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another.

In the following description of examples, reference is made to the accompanying drawings in which it is shown by way of illustration specific examples that can be practiced. It is to be understood that other examples can be used, and structural changes can be made without departing from the scope of the various examples.

Generally, diffraction gratings, such as Echelle gratings, may reduce channel crosstalk, phase errors, and optical losses to input and output light. Different factors that may be considered when designing an optical component with an Echelle grating may include, but are not limited to, the positioning of the input waveguide(s) and the output waveguide(s) relative to one another, the tuning range of each of the waveguides, the channel spacing between the waveguides, the energy efficiency of the optical system, and so forth. In some examples, the positioning of the input waveguide(s) and the output waveguide(s) as well as the ability to tune the Echelle grating using a tuning element may reduce a size of the Echelle grating.

Disclosed herein is an optical component that includes an Echelle grating, that may be tunable. The optical component may include an Echelle grating, a tuning pad, an input waveguide(s) and an output waveguide(s). The output waveguide may be located between the input waveguides and all of the waveguides may be located on or near a Rowland circle. The placement of the input and output waveguides at first location(s) between the second location(s) (or vice versa) can reduce the size of the device.

In some examples, the tuning pad may be a metal pad, which may be heated by applying a current to the metal pad. The metal pad may be disposed on a slab waveguide through which the input and output light propagate. As the metal pad increases in heat, a local portion of the slab waveguide may also increase in temperature and the index of refraction may shift. The shift in the index of refraction of the propagation region of the slab waveguide may cause a peak wavelength of a channel to also shift, thus tuning the peak wavelength of the channel so that no loss of light may occur. In tuning the peak wavelength by heating the tuning pad, a little to no loss tuning method may be achieved that is also energy efficient. In some examples, the tuning pad may adjust the temperature of the slab waveguide. In some examples, the tuning pad may adjust the temperature of the slab waveguide by either increasing or decreasing the temperature of the slab waveguide. In some examples, the temperature may be decreased by positioning a heat sink (such as a Peltier junction) adjacent to, or abutting, the tuning pad. In certain embodiments, the tuning pad itself may function as a heat sink. The slab waveguide may include a core or propagation region with cladding layers on both sides of the propagation region. In some examples, the tuning pad may adjust the temperature of the propagation region of the slab waveguide, which may result in a shift in the index of refraction of the propagation region.

These and other embodiments are discussed below with reference to FIGS. 1A-4. However, those skilled in the art will readily appreciate that the detailed description given herein with respect to these Figures is for explanatory purposes only and should not be construed as limiting.

FIG. 1A illustrates a block diagram of a cascaded direct coupler optical multiplexing system. FIG. 1A may be an optical multiplexing system 100 that includes light sources 135 and direct couplers. Various systems may be used to multiplex light emitted by light sources but may include different components and may vary from one another in different ways, such as size, optical efficiency, energy efficiency, wavelength dependence or independence, any combination thereof and so forth. As illustrated in FIG. 1A, the direct couplers 137a-137d may be two by two optical couplers 137 and the direct couplers 139a and 139b may be two by one optical couplers 139. The optical multiplexing system 100 may provide multiple wavelengths of light from multiple light sources to be combined into a single output. In some examples, the light sources 135a-135h may be tunable light sources, lasers, tunable lasers, laser diodes, any coherent or semi-coherent light source, a collimated light source, any combination thereof and so forth. In some examples and as shown in FIG. 1A, the light sources 135a-135h may be configured to emit a single wavelength of light or may be configured as a tunable light source that may be capable of emitting a range of wavelengths of light, for example 15 nanometers. In some examples, the tunable light source may be capable of emitting greater than or less than 15 nanometers. In some examples, a first light source 135a may emit light in a first wavelength range of 15 nanometers and a second light source 135b may emit in a second wavelength range of 15 nanometers. In some examples, the emitted first and second wavelength ranges of light may be greater or less than 15 nanometers, the wavelength ranges of light may be overlapping, and in other examples, the first and second wavelength ranges of light may not be overlapping. Additionally, although eight light sources 135 are depicted in FIGS. 1A and 1n other examples described herein, any number of light sources may be employed in the optical multiplexing system.

In FIG. 1A, the light sources 135a-135h may emit light to the two by two direct couplers 137a-137d, via the waveguides 136a-136h and the two by two direct couplers 137a-137d may receive the light emitted by the light sources 135a-135h. The two by two direct couplers 137a-137d may combine half of each input light on each of the light outputs so that the light outputs 143a-143d may include half of the light emitted by the first light emitter and half of the light emitted by the second light emitter. Similarly, light outputs 141a-141d may include the other half of the light emitted by the first light emitter and the other half of the light emitted by the second light emitter. For example, each of the two by two direct coupler splits the received light into halves, and then combines the split halves of each light input and outputs the combined halves onto each of the light outputs. The light outputs 141a-141d may pass to the two by one direct couplers 139a and 139b and the light outputs 143a-143d may pass to a reference detector (not illustrated in FIG. 1A). Generally, as shown in FIG. 1A, light paths 141a-141d may provide light to the two by one detectors 139a-139b via the waveguides 144a and 144b and light paths 143a-143d may provide light to one or more reference detectors. The reference detector may be configured to monitor various optical properties of light such as wavelength and power.

The light from light output 141a may be received by the two by one direct coupler 139a. Light from the light output by the third light source 135c and the fourth light source 135d may also be received (via the two by two coupler 137b) by the two by one direct coupler 139a. The light received by the two by one direct coupler 139a may be combined and transmitted via the waveguide 144a to the two by one direct coupler 139c. In this way, the multiple light sources 135 may provide multiple light inputs to the optical multiplexing system, which may combine the multiple wavelengths of light emitted by the light sources 135 to one output. Although direct couplers are optically efficient, the number of direct couplers increases with the number of input light sources. More specifically, as the number of input light sources increases, the total number of direct couplers increases as well as the number of cascading direct couplers. As illustrated in FIG. 1A, three sets of direct couplers, totaling seven couplers, optically cascade from one set to the next in order to accept light from eight inputs. For example, the set of four direct couplers 137 optically cascade to the set of two direct couplers 139a and 139bB, which then optically cascade to the direct coupler 139c. Because optical sensing systems are being incorporated into smaller and smaller form factor devices, cascading direct couplers may be too large in size to reasonably be incorporated into the smaller form factor devices such as a mobile device.

Figure 1B:
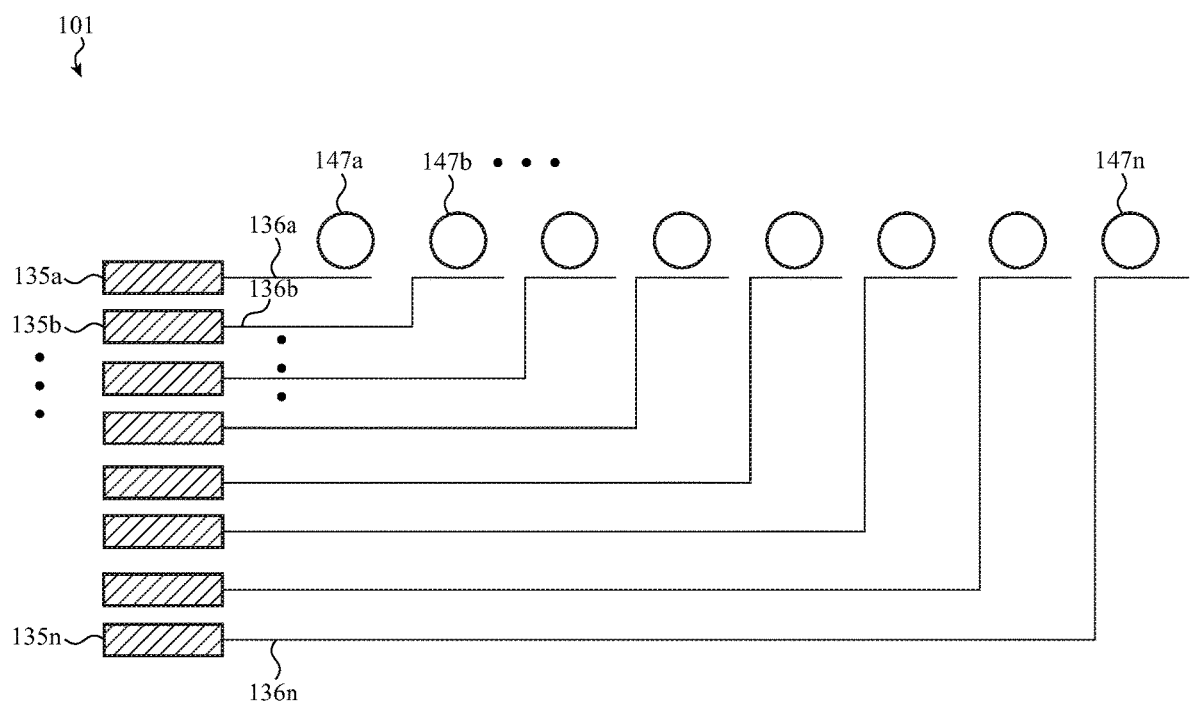
FIG. 1B illustrates a block diagram of an optical ring resonator optical multiplexing system.

FIG. 1B illustrates a block diagram of an optical ring resonator optical multiplexing system. FIG. 1B illustrates an optical multiplexing system 101 that includes light sources 135a-135n, waveguides 136a-136n and optical ring resonators 147a-147n, where n may be any number greater than zero. As illustrated in FIG. 1B, the optical ring resonators 147a-147n may receive light from the light sources 135a-135n via waveguides 136a-136n. Similar to the optical multiplexing system 100, optical multiplexing system 101 of FIG. 1B may provide multiple wavelengths from multiple light sources to be output as one output. In some examples, the optical ring resonators 147 may be in close proximity to the waveguide 136 from which it may receive light. In some examples, the amount of light coupling from the optical ring resonators 147 may depend at least in part on the indices of refraction of the waveguides 136 and the optical ring resonators 147, the distance between the waveguides 136 and the optical ring resonators 147, and the coupling length between the waveguides 136 and the optical ring resonators 147. Similar to FIG. 1A, the size of the optical multiplexing system 101 may increase in scale proportionately with the number of light sources 135. For example, for each light source 135 that is added to the optical multiplexing system 101, a corresponding optical ring resonator 147 may also be added. Due to the direct proportionate increase in size between the number of light sources 135 and the optical multiplexing system 101, the optical ring resonators 147 in the optical multiplexing system 101 may be too large to be reasonably incorporated into the smaller form factor devices such as a mobile device.

Figure 1C:
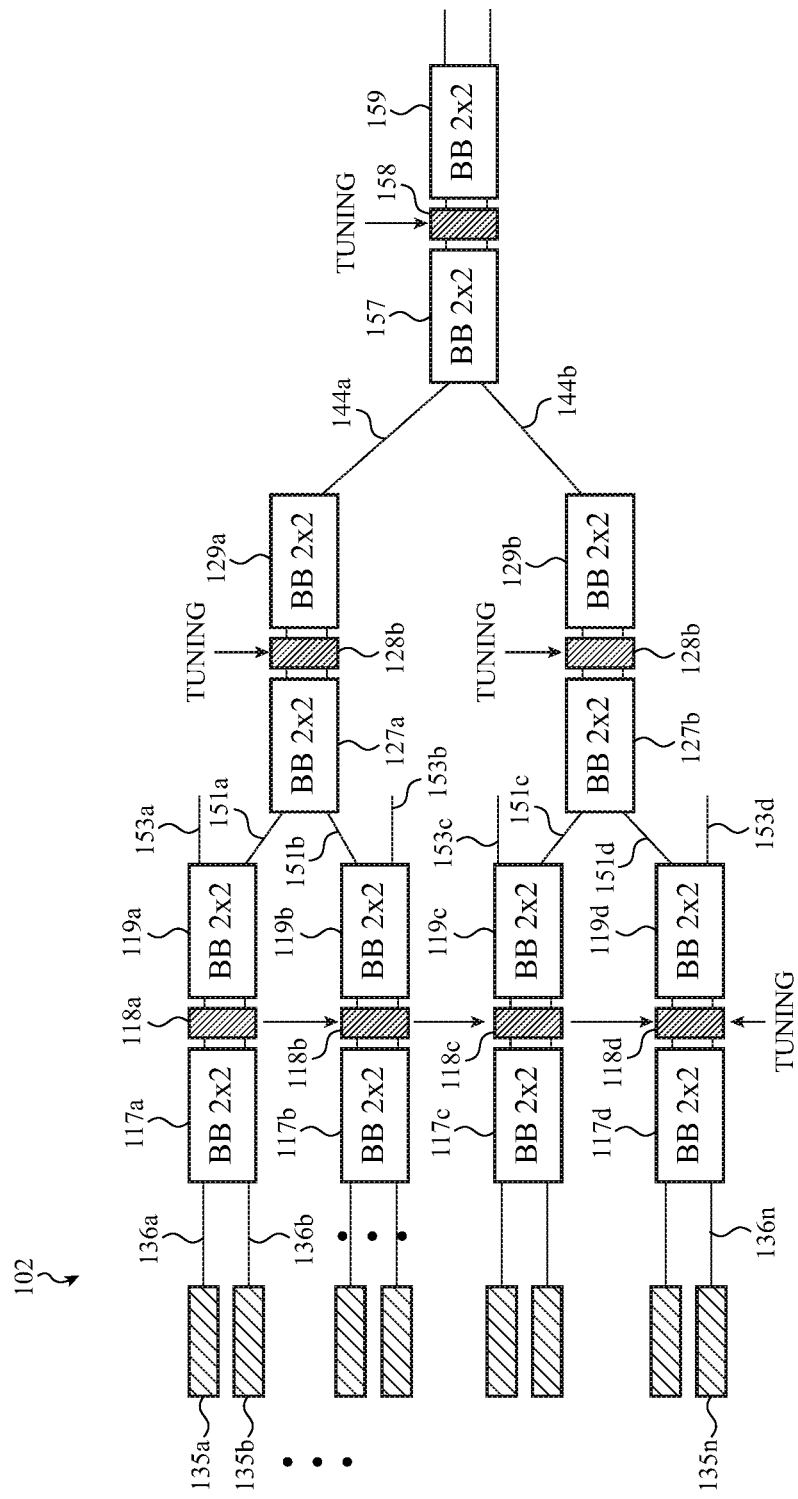
FIG. 1C illustrates a block diagram of a cascaded broadband coupler optical multiplexing system.

FIG. 1C illustrates a block diagram of a cascaded broadband coupler optical multiplexing system. FIG. 1C may be an optical multiplexing system 102 that includes light sources 135a-135n, waveguides 136a-136n, broadband couplers 117a-117d, 119a-119d, 127a-127b, 129a-129b, 157, 159, tuning sections 118a-118d, 128a-128b, and 158. As illustrated in FIG. 1C, the broadband couplers 117, 119, 127, 157 and 149 are two by two broadband couplers, while broadband coupler 129 is a two by one broadband coupler. Similar to the optical multiplexing systems 100 and 101, the optical multiplexing system 102 may provide multiple wavelengths from multiple light sources to be output as two outputs.

In FIG. 1C, the light sources 135a and 135b may be configured to emit light to the broadband coupler 117a, and the light may be received by the broadband coupler 117a. In some examples, the broadband coupler 117a may combine light in a similar manner as the two by two direct couplers of FIG. 1A. The broadband coupler 117a may provide the light to the tuning section 118a. The tuning section 118a may tune the wavelength(s) of light received from the broadband coupler 117a. As illustrated in FIG. 1C, each cascading set of broadband couplers may include a tuning section. In some examples, the tuning section 118a may be metal and tuning the wavelength(s) of light may be achieved by changing the metal temperature. As shown in FIG. 1C, the optical multiplexing system 102 may include seven tuning sections 118, which in turn may use seven different electrodes to apply current to the tuning sections 118. Applying current and heating seven different tuning sections 118 may not be energy efficient and may use a high amount of power.

Further as depicted in FIG. 1C, the tuning section 118a may provide light to the broadband coupler 119a. The two by two broadband coupler 119a may have two output light paths 151a and 153a. Similar to FIG. 1A, light path 153a may provide light to a reference detector (not shown) and light path 151a may provide light to the two by two broadband coupler 127a. The light may pass through a tuning section 128a to another two by one broadband coupler 129a. The two by one broadband coupler 129a may provide light to the two by two broadband coupler 157, to another tuning section 158 and to the two by two broadband coupler 159.

Due to the multistage nature of the cascading broadband couplers of the optical multiplexing system 102 in FIG. 1C, the number of broadband couplers may proportionately increase with the number of light sources, and the optical multiplexing system may become very large as light sources are added to the optical multiplexing system 102. Additionally, in some examples, the optical multiplexing system 102 may be too large to be reasonably incorporated into the smaller form factor devices such as a mobile device. Further, the optical multiplexing system 102 may induce synchronization issues into the light paths.

In some examples, an alternative optical component, such as one with a tunable Echelle grating, may be capable of multiplexing all of the light sources while maintaining a reasonable size and without scaling with the number of light sources. The optical component may include input and output waveguides, a slab waveguide, a tuning pad, and an Echelle grating. The tuning pad, which may be a metal pad, may be disposed on a slab waveguide through which the input and output light propagate. As the metal pad increases in heat, a local portion of the slab waveguide may also increase in temperature and the index of refraction may shift. The shift in the index of refraction of the propagation region of the slab waveguide may cause a peak wavelength of a channel to also shift, thus tuning the peak wavelength of the channel so that no loss of light may occur. In tuning the peak wavelength by heating the tuning pad, a little to no loss tuning method may be achieved that is also energy efficient. In some examples, the tuning pad may adjust the temperature of the slab waveguide by either increasing or decreasing the temperature of the slab waveguide. Additionally, the slab waveguide may include a core or propagation region, with cladding layers on both sides of the propagation region. In some examples, a tuning pad may be positioned on top of the slab waveguide to adjust the temperature of the propagation region may change an index of refraction of the propagation region. This may result in tuning a peak wavelength of a channel. In some examples, the tuning pad may tune a peak wavelength of a corresponding channel that is spaced apart from an adjacent channel by 50 nanometers. Adjusting the temperature of the slab waveguide will be discussed in further detail with respect to FIGS. 2A-4. Tunable optical components will be described in further detail with respect to FIGS. 2A-4.

Optical Component with a Diffraction Grating

Figure 2A:
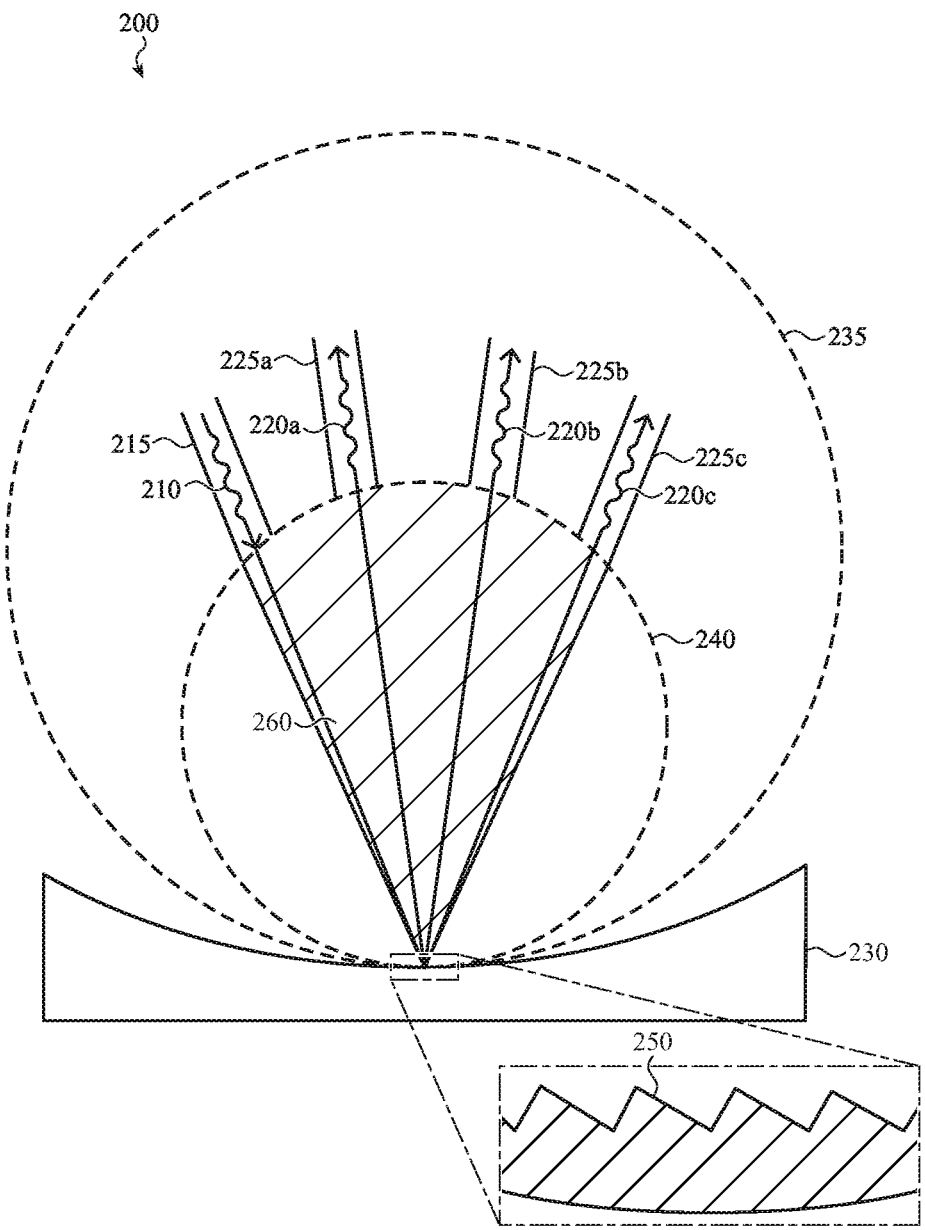
FIG. 2A illustrates an example optical component with an Echelle grating.

FIG. 2A illustrates an optical component with a diffraction grating. The optical component 200 of FIG. 2A may include an input waveguide 215, multiple output waveguides 225, and a diffraction grating 230 which may be an Echelle grating 230. In some examples, the Echelle grating may be a tunable Echelle grating as described in further detail with reference to FIGS. 3A-4. As illustrated in FIG. 2A, the diffraction grating 230 may have a radius of curvature that is associated with an imaginary diffraction grating circle 235. The radius of curvature of the diffraction grating 230 may also be associated with another imaginary circle referred to herein as the Rowland circle 240. The Rowland circle 240 has a diameter that is approximately equal to the radius of the diffraction grating circle 235.

In some examples, the ends of the input waveguide 215 and the output waveguides 225a, 225b, and 225c may be on the Rowland circle 240. When the input waveguides 215a and 215b emit input light 210a and 210b from their ends, located somewhere on the Rowland circle 240 and toward the diffraction grating 230, then a beam reflecting off of the diffraction grating 230 may be split into reflected beams that may come into focus at other points on the Rowland circle 240. Thus, ends of the output waveguides 225a, 225b, and 225c may be positioned on the Rowland circle 240 to accept this reflected light. The single input waveguide and the three output waveguides are used for explanatory purposes only, as the optical component 200 may include one or more input waveguides and one or more output waveguides as appropriate. Additionally, the positioning of the input and output waveguides with respect to each other will be described in further detail with respect to FIGS. 2B-4.

The optical component 200 may separate the output light 220 and the light separation may be wavelength dependent. The light may be separated and output as individual wavelengths of light or wavelength ranges of light. In some examples, the input light 210 may be in a wavelength range of light of approximately 1.3 µm-2.5 µm and the output light 220a and 220b may be in two separate wavelength ranges of light, both of which may be within the input light wavelength range. In some examples, the wavelength range of light may be a broadband wavelength range of light, which may span approximately one micron of wavelengths of light. The separation of the input light will be discussed in further detail with reference to FIGS. 2B-4.

The input light 210 may be provided by an input waveguide 215 and the output light 220 may be received by output waveguides 225a, 225b, and 225c. As discussed herein, the output waveguides may be referred to as output waveguides 225 or individually with a separate element number for each output waveguide such as output waveguide 225a and output waveguide 225b. In some examples, the input and output waveguides may be strip waveguides. Although the input light 210 may be discussed as emitting light into the optical component 200, it may be understood that a light source not illustrated in FIG. 2A may provide light to the input waveguide 215. Similarly, the output waveguides 225 may be discussed as receiving output light 220, but the output waveguides 225 may provide the output light 220 to one or more light detectors that are not illustrated in FIG. 2A. The detector(s) can include any type of diode that can respond to or measure photons impinging on its active area. The detector(s) can generate one or more detector signals indicative of the output light.

In FIG. 2A, for explanatory purposes only, the input waveguide 215 is located at a first position and the output waveguides 225 are located all to one side of the input waveguide 215; however, in other examples, the input and output waveguides may be arranged in different configurations. In some examples and as discussed with reference to FIGS. 2B-4, the output waveguides 225 may be located on both sides of the input waveguide 215, there may be two input waveguides 215 that may be located on both sides of an output waveguide 225, and so forth.

The input waveguide 215 may emit input light 210 into slab waveguide 260, represented by the shaded area. In FIG. 2A, the slab waveguide 260 includes the optical path of the input light optical path and the optical path of the output light. More specifically, the input light optical path and the output light optical path may lie in the slab waveguide 260.

Although the shaded area in FIG. 2A depicts the slab waveguide 260 as bounded by the input and output waveguides, in some examples, the slab waveguide 260 may extend beyond these paths. In some examples, the area outside of the slab waveguide 260 may be a doped material to prevent the attenuation of input light and output light.

In some examples, the input light 210 may be received by the input waveguide 215 from one or more light emitters (not shown in FIG. 2A), and the input light 210 may propagate from the input waveguide 215 into the slab waveguide 260 toward the diffraction grating 230. The slab waveguide 260 may be optically coupled to the diffraction grating 230, so that the slab waveguide 260 may emit light that will reflect off of the diffraction grating 230. The input light 210 may then reflect off of the diffraction grating 230 as reflected light propagating along a reflected light path and as output light 220a, 220b, and 220c. Additionally, the slab waveguide may include a core or propagation region, with cladding layers on both sides of the propagation region. In some examples, a tuning pad may be positioned on top of the slab waveguide to adjust the temperature of the propagation region may change an index of refraction of the propagation region. This may result in tuning a peak wavelength of a channel. Adjusting the temperature of the slab waveguide will be discussed in further detail with respect to FIGS. 3A-4.

After being reflected the reflected light may propagate back through the slab waveguide 260 along a first reflected light path, a second reflected light path, and a third reflective light path, toward the output waveguides 225a, 225b, and 225c, respectively. As previously discussed, the input waveguide 215 and the output waveguides 225 may be strip waveguides. The input waveguide 215 and the output waveguides 225 may be optically coupled to the slab waveguide 260 to reduce the loss of light at the interface of the waveguides.

Also shown in the expanded section of FIG. 2A are the reflective facets 250 of the diffraction grating 230. The expanded section of FIG. 2A is for illustrative and explanatory purposes and is not to scale. Additionally, although four reflective facets 250 are illustrated, the diffraction grating 230 may include any appropriate number of reflective facets 250. Each of the reflective facets 250 may be approximately equidistant from one another. Additionally, the optical component 200 may include an input waveguide 215 for emitting light 210 toward the diffraction grating 230 and the output light 220 may be received at output waveguides 225.

The locations of the input waveguide 215 and the output waveguides 225 may depend at least partially on the radius of curvature of the diffraction grating 230. In some examples, the input waveguide 215 and the output waveguides 225 are located adjacent to the Rowland circle 240, and the Rowland circle 240 depends on the radius of curvature of the diffraction grating 230. Additionally, the reflective facets 250 of the diffraction grating 230 may determine the angle at which the input light reflects off of the diffraction grating 230 in conjunction with the radius of curvature of the diffraction grating 230. For example, when the reflective facets 250 have a different facet angle, light may reflect in a different direction and/or at a different angle from the diffraction grating 230. In turn, the angles 270a and 270b, at which the light reflects may at least in part determine the location of the output waveguides 225 on the Rowland circle 240. Although the input and output waveguides are discussed as being located on the Rowland circle 240, in some examples, the input and output waveguides may not be located on the Rowland circle 240.

In FIG. 2A, the input light 210 propagates in the slab waveguide 260. Such light propagation may be discussed herein as the light being emitted along an input light path or an input optical path, where the terms "light path" and "optical path" may be used interchangeably. Similar to the input light, when the output light 220 propagates from the diffraction grating 230 through the slab waveguide 260, this may be described as the output light being received on an output light path.

Figure 2B:
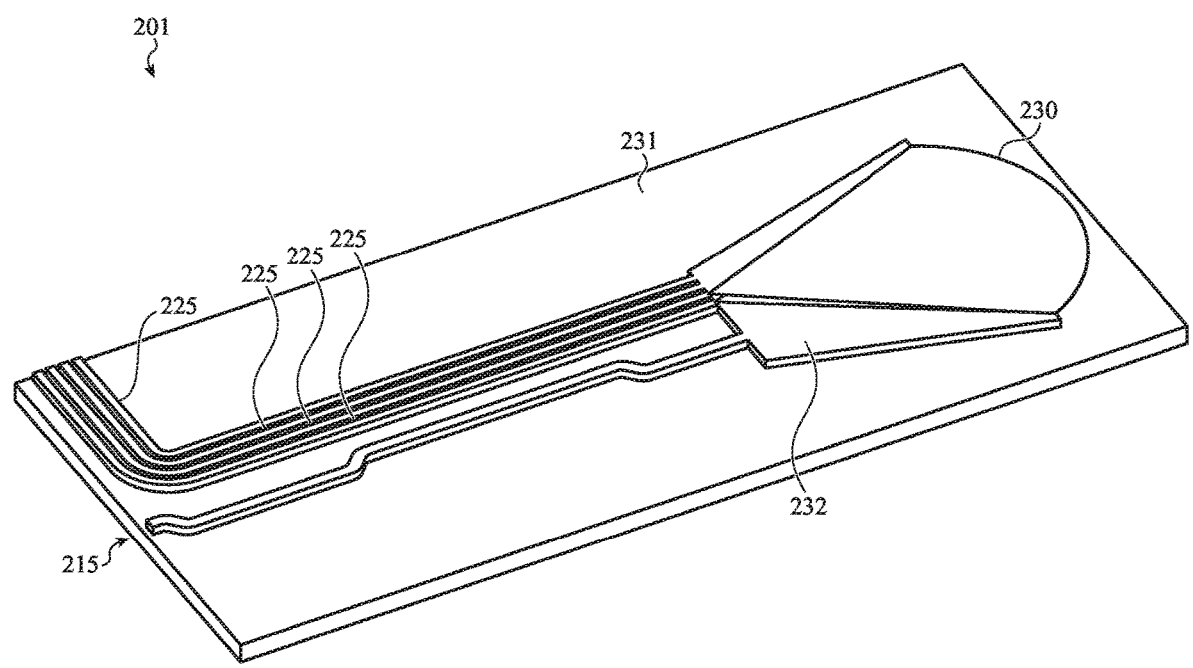
FIG. 2B illustrates an example optical component with an Echelle grating.

FIG. 2B illustrates an example optical component with an Echelle grating. The optical component 201 includes similar components to those of the optical component 200 of FIG. 2A. The optical component 201 includes an Echelle grating 230, a substrate 231, a slab waveguide, 232, an input waveguide 215, and output waveguides 225. Similar to FIG. 2A, light may propagate through the input waveguide 215 and propagate into the slab waveguide 232. The light may be received from the slab waveguide 232 and by the Echelle grating 230 and the light may be diffracted back through the slab waveguide 232 and toward the output waveguides 225. The slab waveguide 232 and input and output waveguides 215, 225 may be disposed on top of the substrate 231, which in some examples may be a silicon substrate.

Figure 2C:
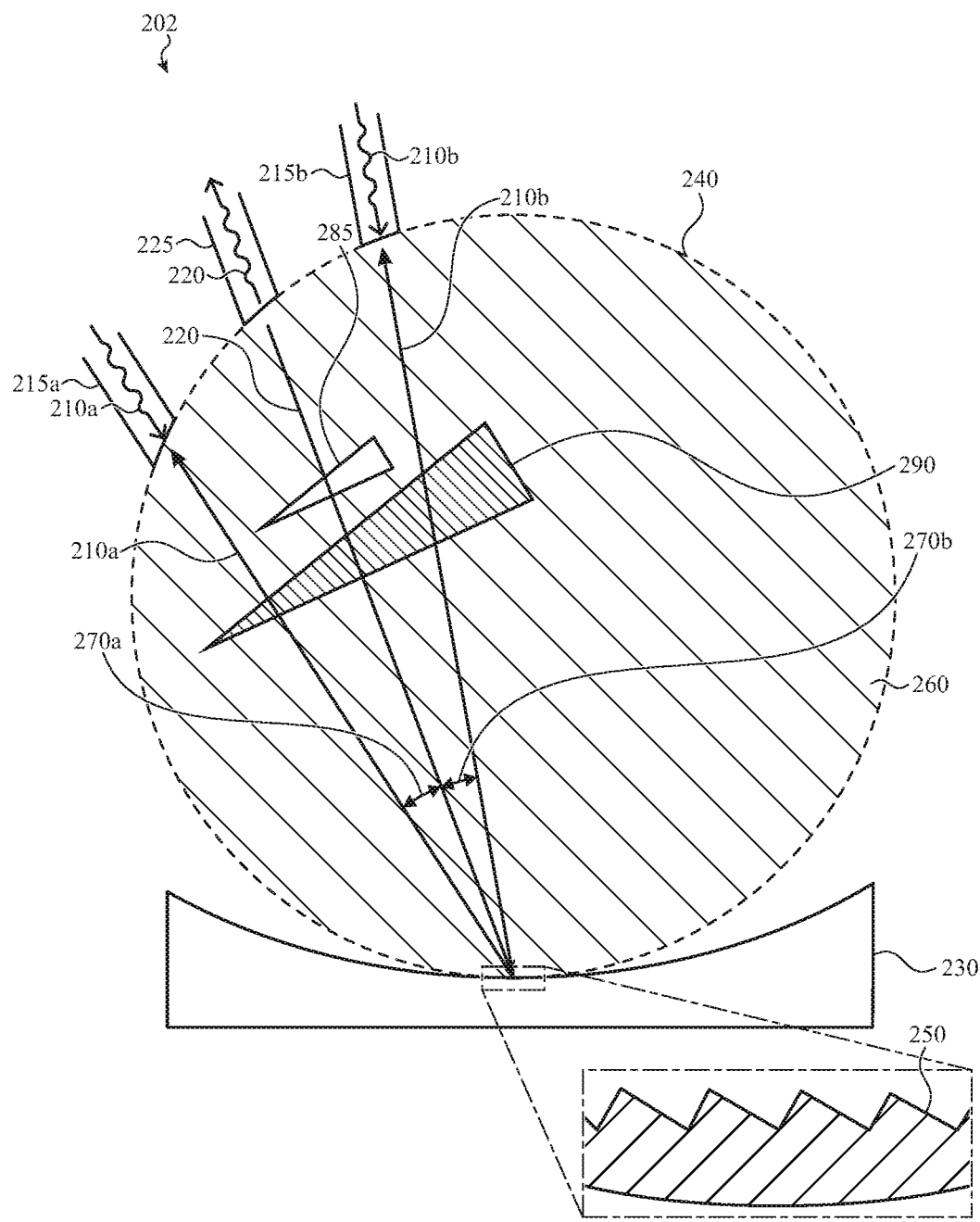
FIG. 2C illustrates another optical component with an Echelle grating.

FIG. 2C illustrates an optical component with an Echelle grating. The optical component 202 of FIG. 2C is similar to the optical component 200 of FIG. 2A, except for the positioning of the input waveguides 215A and 215B is different with respect to the output waveguide 225. In FIG. 2C, the output waveguide 225 is positioned between the input waveguides 215a and 215b. The optical component 202 also includes the Rowland circle 240, a tuning pad 290, a monitoring pad 285, and a diffraction grating 230. For the purposes of discussion, similarly numbered elements may have similar characteristics and functionality. In FIG. 2C, the optical component 202 is a multiplexer and the diffraction grating 230 can combine light 210A and 210B from input waveguides 215a and 215b to provide output light 220 to the output waveguide 225. In some examples, the diffraction grating 230 can be used to multiplex (e.g., combine) light having multiple wavelengths or wavelength ranges. Although FIG. 2C illustrates two input waveguides and a single output waveguide, in other multiplexer examples, any appropriate number of input waveguides and output waveguides may be used so long as there are fewer output waveguides than input waveguides.

In some examples, the diffraction grating 230 of FIG. 2C may be an Echelle grating. An Echelle grating may be particularly suitable for generating higher diffractive orders of light due to the nature of the periodic structure of the reflective facets (the reflective facets are not illustrated in FIG. 2C). In some examples, Echelle gratings may provide high dispersion having a small footprint size. The diffraction grating 230 may have a tunable peak wavelength; heating the tuning pad 290 may adjust ("tune") the peak wavelength. As the tuning pad 290 increases in temperature, the diffraction grating 230 may also increase in temperature, thus shifting the index of refraction and changing the peak wavelength of the diffraction grating 230. In some examples, it may be desirable to monitor the temperature shift of the tuning pad 290, and this temperature may be monitored using the monitoring pad 285. The tuning pad 290 may be heated by applying a current thereto. The temperature of the tuning pad 290 may be varied by varying the applied current. In some embodiments, the tuning pad 290 may be cooled by coupling the pad to a heat sink, such as a Peltier junction. Cooling the tuning pad 290 may also adjust the index of refraction of the diffraction grating 230.

In some examples, the wavelengths of the input light of input waveguides 215A and 215B may be in a first wavelength range, and in a second wavelength range, which may be separated from the first wavelength range by a separation wavelength band of at least 0.1 μm, and the output light of output waveguide 225 may be in a broadband wavelength range. In some examples, the separation wavelength band may be more or less than 0.1 μm. In some examples, the input wavelengths of the input waveguides 215a and 215b may be continuous or overlapping. Although the diffraction grating 230 is discussed herein as reflecting light, it may be understood that the reflective facets of the diffraction grating reflect the light. The light may propagate through a slab waveguide. In some embodiments, the slab waveguide's edge may be the same as the circumference of the Rowland circle 240, as illustrated, while in other embodiments the slab waveguide may be larger or smaller than the Rowland circle, or may have any suitable shape, whether circular or not. This is true of the slab waveguides illustrated in FIGS. 2C, 3A, and 4, as well.

In some example embodiments, a "broadband wavelength range" may be generally a set of emitted broadband wavelengths and/or detected broadband wavelengths over the approximate range of 1 μm. In some examples, the 1 μm emitted and/or detected broadband wavelengths may be in the "broadband" range of approximately 1.0 μm and 3.0 μm. Accordingly, embodiments described herein may operate over, or employ, an operating range that may correspond to, or be encompassed in, a broadband wavelength range. Examples of such operating ranges include 1.0 μm-2.0 μm, 1.3 μm-2.3 μm, 1.4 μm-2.4 μm, 1.5 μm-2.5 μm, and so forth. Although specific wavelength ranges may be discussed, any appropriate wavelength or wavelength range may be emitted and/or detected by the photonics elements described herein, depending on the use and construction of those elements.

In some examples, the diffraction grating 230 may be an Echelle grating. The Echelle grating may be designed to have a reduced footprint size by leveraging the wavelength separation between the first set of wavelength ranges of light of the first input waveguides and the second set of wavelength ranges of light of the second set of input waveguides. With the separation between wavelength range, the optical component 202 may include separate waveguides which may be coupled to separate detectors for detecting the different wavelength ranges of light. For example, a first detector can be coupled to the output waveguide 225 for detecting output light.

An Echelle grating may be multi-functional and used for either one or any combination of diffraction, multiplexing, and refocusing of the input light. The multi-functional diffraction grating can lead to a reduction in the grating size and the overall optical device size, but in some examples, this may lead to the possible locations of the input and output waveguides being reduced. By separating the input wavelength ranges of light using the Echelle grating, the location options of the input waveguides 215 and the output waveguide 225 can increase.

In some examples, the Echelle grating 230 may be capable of receiving and multiplexing input light with wavelengths that collectively span around or over one micron. As depicted in FIG. 2C, the input waveguides through which the light propagates may be separated by an output waveguide. In some examples, the Echelle grating 230 may be a tunable Echelle grating insofar as the peak wavelength of a corresponding channel may be tuned using a heater, which may be a tuning pad positioned over the slab waveguide. The tunable Echelle grating will be described in further detail with reference to FIGS. 3A-4.

Figure 3A:
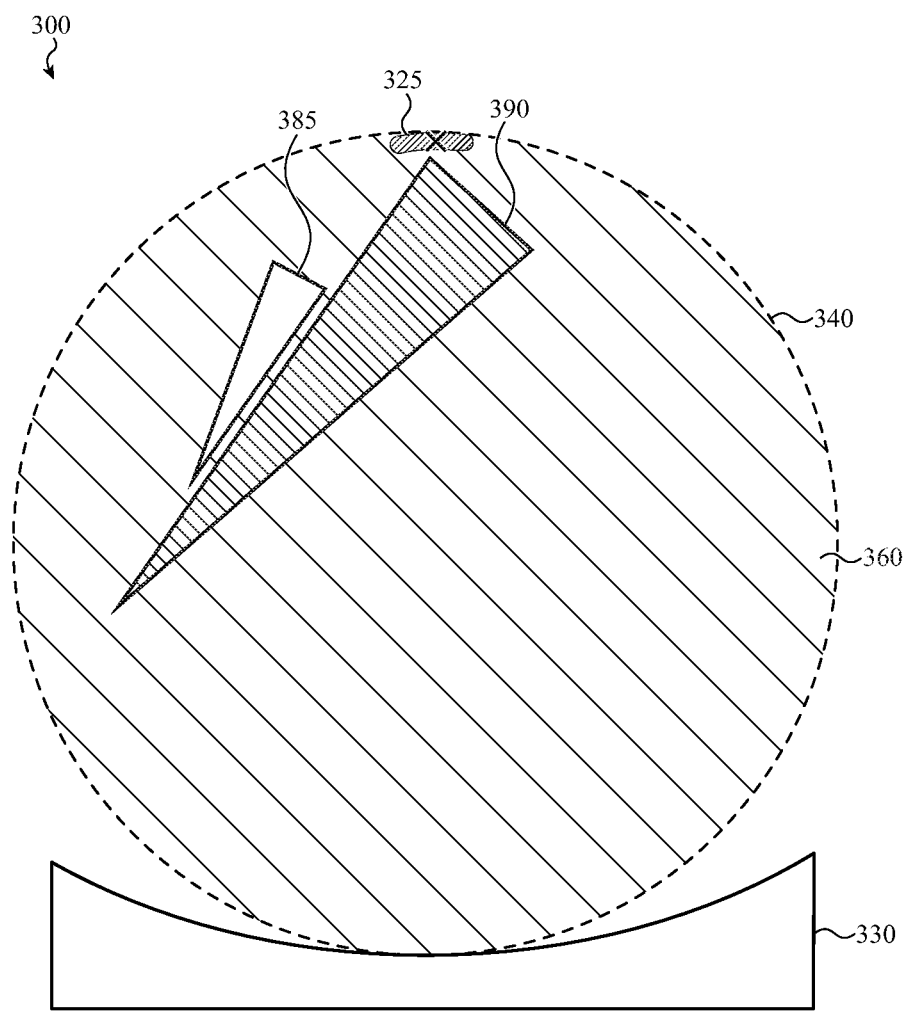
FIG. 3A illustrates another optical component with a tunable Echelle grating.

FIG. 3A illustrates an optical component with a tunable Echelle grating. The optical component 300 includes the Rowland circle 340, the output waveguide 325, the tuning pad 390, metal monitoring pad 385, and the Echelle grating 330. As previously described with reference to FIGS. 1A-2C, a tunable Echelle grating may allow for multiplexing multiple light sources without scaling up the size of the Echelle grating 330 as the number of light sources increases. In some examples, the light sources may emit light in a broadband wavelength range of light. Although the Echelle grating size may not scale with the wavelength range, the size of the Echelle grating may be based at least in part on the tuning range of each of the waveguides. In some examples, the Echelle grating 330 may occupy an approximate space of 0.6 by 0.6 mm^2, although in other examples, the Echelle grating 330 may be larger or smaller depending on the overall device into which it is integrated. The light propagating from the Echelle grating 330 to the output waveguide 325 may propagate through a slab waveguide 360 that may be bounded by the Rowland circle 340, or may occupy an area larger or smaller than the Rowland circle 340.

The tunable Echelle grating may move the center of the wavelength peak in a channel by heating the tuning pad in an energy efficient manner with little to no loss penalty, such as losing light. By heating the slab waveguide in a localized region instead of heating the entire slab waveguide, the benefit of moving the center wavelength peak may be realized while being more energy efficient. In some examples, the peak wavelength may move approximately 50 nanometers or less. That is, the tuning range may be approximately between zero and 50 nanometers, and in some examples, the tuning range may be larger. Additionally, the size of the Echelle grating may also be based at least in part on the channel spacing between the waveguides.

In one example, the tuning peak of a channel may have a wavelength of interest around approximately 1.95 microns. As the optical component 300 is heated by the tuning pad 390, the peak may shift to the left which may result in a relatively small absolute loss (for example, on the order of two dB), but because the wavelength peak may also shift to the left with the temperature (due to the index of refraction change), under the increased temperature, there may be little to no loss of light.

By applying a current to the tuning pad 390, the metal may increase in temperature and heat the portion of the slab waveguide beneath the tuning pad 390. When the slab waveguide increases in temperature, the index of refraction of the slab waveguide may change, thus shifting the center wavelength peak of the channel. In some examples, when the peak wavelength is tuned by approximately 50 nanometers or less, the shift in the index of refraction of the slab waveguide may be 0.04 or less. The shift in the propagation region's index of refraction causes this peak wavelength shift. Additionally, tuning the peak waveguide may depend on numerous factors that may interact with one another, such as slab waveguide material, slab waveguide shape, slab waveguide thickness, tuning pad material, tuning pad thickness, tuning pad shape, tuning pad location, optical path length, location of the input and output waveguide(s), wavelength range(s) of light, reflective facet blaze angle, any combination thereof, and so forth, By accounting for one or more of these factors, the peak wavelength may be tuned. Further, the shift in the index of refraction may be in the propagation region of the slab waveguide, which in some examples may be silicon. Although more than one tuning pad 390 may be used, the single tuning pad 390 may be heated to tune the center of the wavelength peak in a channel. In some examples, the channel may be the propagation path of the light through the slab waveguide when light is reflected off of the Echelle grating 330. In some examples, the center wavelength peak may be based on the desired information to be measured in a sample. For example, different wavelengths may be used to measure different information in the sample, thus the center wavelength peak may shift depending on the sample measurement.

Additionally, although the Echelle grating 330 may be heated in a localized region, a temperature gradient may still be associated with the localized region. Because the temperature increase may propagate through the Echelle grating, heat shielding may be employed to inhibit the heating of adjacent or abutted elements. In some examples, the heating of the Echelle grating 330 may be localized enough that heat shielding may not be used.

As depicted in FIG. 3A, the tuning pad 390 may be a metal tuning pad 390 and may be a triangular shape. In some examples, the metal tuning pad 390 may be any shape such as triangular, circular, rectangular, trapezoidal, oval, any asymmetric shape, any symmetric shape, any combination thereof, and so forth. In some examples, the metal tuning pad 390 may be in the approximate thickness range of 75 nanometers to 950 nanometers. In some examples, the metal tuning pad 390 may be approximately 100 nanometers or within approximately ten percent of 100 nanometers. Additionally, the metal tuning pad 390 may be a high resistance metal that may heat as you pass current through it and may be any type of metal such as platinum or gold. In some examples, the metal tuning pad 390 may have an approximate heating range of up to 20-25 degrees Celsius. In some examples, the change in temperature may increase to approximately 23 degrees Celsius or less. The temperature range may be wide enough that it causes the peak wavelength to shift over the desired wavelength range.

In some examples, the temperature of the metal tuning pad 390 may be measured using a separate metal monitoring pad 385 that functions as a monitoring resistor that is positioned close to the heated region of the slab waveguide. By monitoring the change of temperature of the metal monitoring pad 385, the temperature differential for tuning may be controlled. In some examples, the temperature shift to achieve a corresponding peak wavelength shift may be determined at a calibration stage. In calibrating the amount of temperature shift needed to achieve a peak wavelength shift, the spectrum range may be scanned so that the temperature change for tuning the different peak wavelength shifts may be determined. The calibration may be performed once due to the stability of the tunable Echelle grating and the light sources. Additionally, the temperature changes may be correlated to the corresponding injection current applied to the metal tuning pad 390, so that the correct amount of current may be applied to achieve the desired temperature and accordingly, the peak wavelength shift.

In still further examples, the temperature shift may be observed via a feedback loop in which some of the optical power may be tapped and split off to be transmitted to an optical power monitor. The optical power may be monitored continuously in a feedback loop to monitor the peak wavelength shift caused by the temperature change, may be continuously or periodically monitored for optical power, or may be monitored periodically in a feedback loop due to the stable nature of the tunable Echelle grating and the light sources.

Figure 3B:
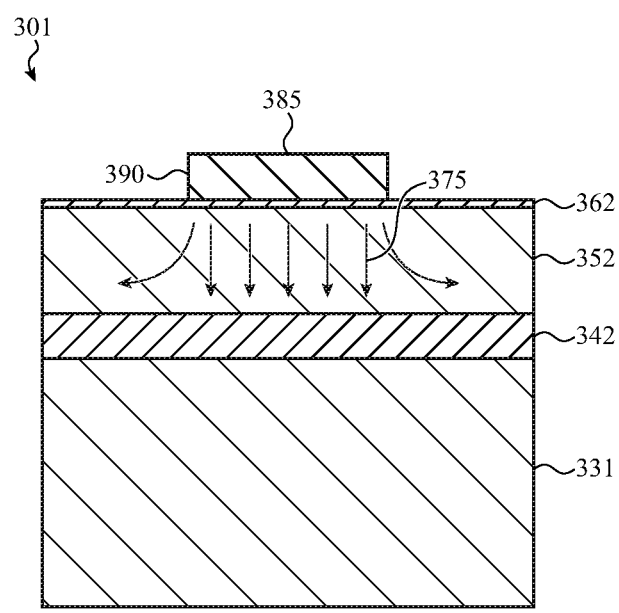
FIG. 3B illustrates a cross-section of an optical component with a tunable Echelle grating.

FIG. 3B illustrates a cross-section of an optical component with a tunable Echelle grating. The optical component 301 includes a silicon substrate 331, a slab waveguide that includes a first cladding layer 342, a silicon layer 352, and a second cladding layer 362, a metal tuning pad 390, and a metal monitoring pad 385. As shown in FIG. 3B, the first cladding layer 342 may be disposed on the silicon substrate 331, the silicon layer 352, which may be a propagation region, may be disposed on the first cladding layer 342, and the second cladding layer 362 may be disposed on the silicon layer 352. Additionally, the metal tuning pad 390 may be disposed on the second cladding layer 362. Although the metal monitoring pad 385 is depicted as being positioned on top of the metal tuning pad 390, in some examples, the metal monitoring pad 385 may be proximate to the metal tuning pad 390. As depicted in FIG. 3B, light emitted by the light sources would propagate into or out of the plane of the page.

As described with reference to FIG. 3A, the metal tuning pad 390 may be disposed on top of the slab waveguide. As shown in FIG. 3B, the light may pass through the slab waveguide and underneath the metal tuning pad 390. The light may propagate through the propagation region of the waveguide, which is the silicon layer 352. In some examples, the propagation region may be a silicon layer with an approximate thickness of three microns. The first cladding layer 342 and the second cladding layer 362 may be an oxide such as silicon dioxide or other appropriate dielectric materials.

Figure 4:
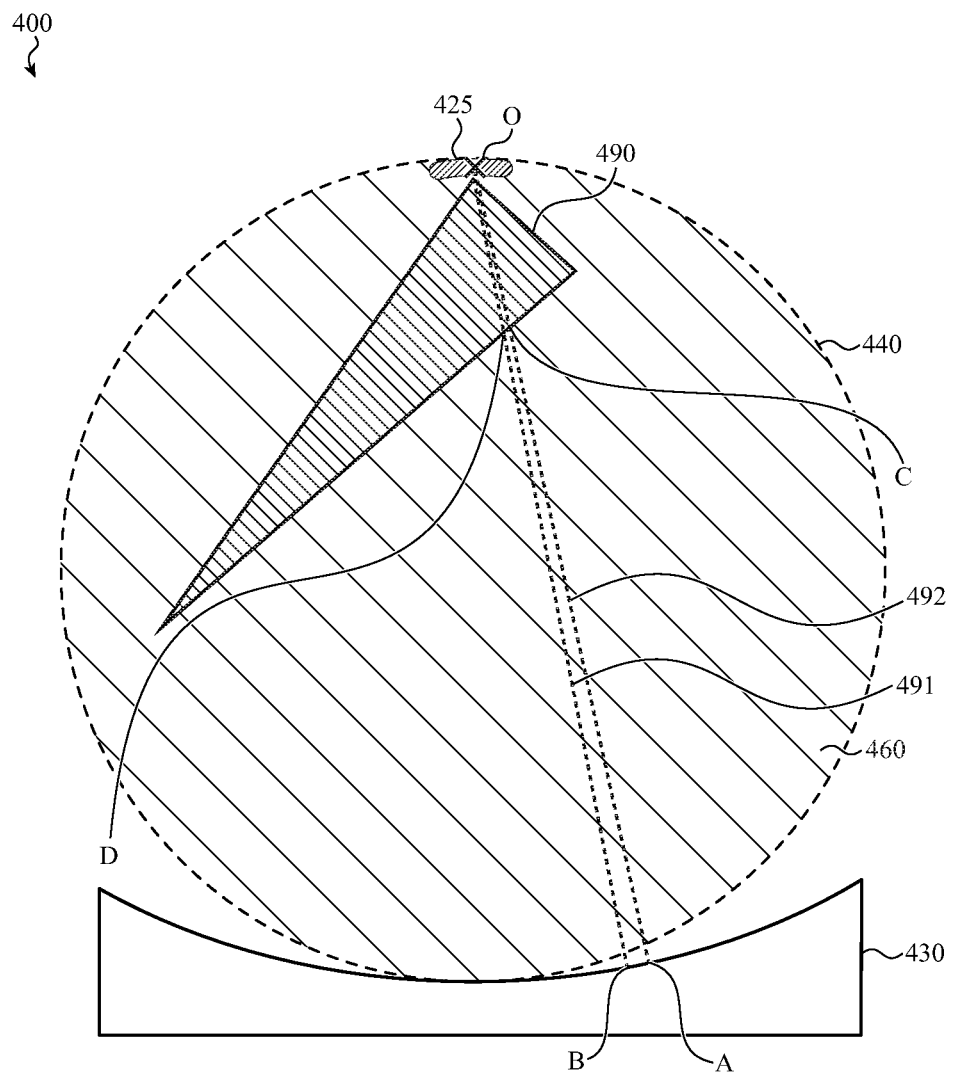
FIG. 4 illustrates another optical component with a tunable Echelle grating.

FIG. 4 illustrates another optical component with a tunable Echelle grating. The optical component 400 includes the Rowland circle 440, the output waveguide 425 which may be located at a position O, the Echelle grating 430, the metal tuning pad 490, first ray 491 and second ray 492. The first ray 491 may be a ray defined by the distance OB and the second ray 492 may be a ray defined by the distance OA. The tuning range of the metal tuning pad 490 may be a portion of the first ray 491 and the second ray 492. The tuning range of the first ray 491 may be the first tuning range OD and the tuning range of the second ray 492 may be the second tuning range OC. The tunable Echelle grating 430 may move the center of the wavelength peak in a channel by heating the metal tuning pad in an energy efficient manner with little to no loss penalty, such as losing light. Additionally, the light propagating from the Echelle grating 430 to the output waveguide 425 may propagate through a slab waveguide 460 that may be bounded by the Rowland circle 440, or may occupy an area larger or smaller than the Rowland circle 440.

In some examples, the optical component may position an output waveguide in a gap between the input waveguides, and the output waveguide may be in the center of the waveguide array. In some examples, the gap may be between approximately 0.25 microns and may be 1.85 microns to 2.1 microns. Additionally, the design wavelength may be selected within the gap.

In some examples, the wavelength shift may be determined by the equation:

$$\Delta\lambda = 2 * \Delta n * \Delta L$$

where $\Delta n = \Delta T * dn/dT$ may be tuned by temperature, and $\Delta L = OD - OC$ may be the path difference between the two adjacent rays or path lengths, first ray 491 and second ray 492. In some examples, the adjacent rays or path lengths may be between the output waveguide and the set of grating facets. In some examples, given a constant shift or change in a wavelength of light, the change in the index of refraction may be inversely related to the change in path length, insofar as for a constant change in the wavelength of light, when the change in index of refraction increases, the path length may decrease.

In some examples, $\Delta L$ may be limited by the grating size and the number of grating teeth of the tunable Echelle grating 430. In some examples, $\Delta L$ may be advantageously leveraged so that $\Delta n$ may be smaller, less temperature change is needed, and the optical component 400 is more energy efficient due to a decreased applied current. Additionally, although the temperature may change multiple times, the change may be measured by the difference between the new temperature and the initial temperature. Similarly, the change in refractive index may be measured by the difference between the new refractive index and the initial refractive index of the slab waveguide.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An optical component, comprising:
   a slab waveguide;
   a first input waveguide configured to emit a first light into the slab waveguide;
   a second input waveguide configured to emit a second light into the slab waveguide;
   a set of grating facets configured to:
     receive the first light from the first input waveguide and the second light from the second input waveguide; and
     reflect the emitted first light as a first reflected light and emitted second light as a second reflected light;
   an output waveguide configured to receive the first reflected light along the first reflected light path and from the slab waveguide; and a tuning pad disposed on the slab waveguide and operable to adjust a temperature of the slab waveguide;
the output waveguide is located between the first input waveguide and the second input waveguide;
the slab waveguide comprises:
a first cladding layer disposed on a substrate;
a propagation region disposed on the first cladding layer; and
a second cladding layer disposed on the propagation region; and
the tuning pad is configured to:
heat the propagation region of the slab waveguide, thereby shifting an index of refraction of the propagation region to change a peak wavelength of a corresponding channel.

2. The optical component of claim 1, wherein the first input waveguide and the second input waveguide emit light that is in a broadband wavelength range spanning at least one μm.

3. The optical component of claim 1, wherein:
the first reflected light is in the first wavelength range; and
the second reflected light is in a second wavelength range spaced apart from the first wavelength range by at least 0.1 μm.

4. The optical component of claim 1, wherein:
the tuning pad is configured to shift a peak wavelength of a corresponding channel; and
the peak wavelength shift is 50 nanometers or less.

5. The optical component of claim 1, wherein the tuning pad is configured to shift an index of refraction by 0.04.

6. The optical component of claim 5, wherein:
the optical component further comprises a light path having a path length between the output waveguide and the set of grating facets; and
a change in path length is inversely related to the shift in the index of refraction for a constant shift in a wavelength of light.

7. The optical component of claim 1, wherein the tuning pad tunes a peak wavelength of a corresponding channel that is spaced apart from an adjacent channel by 50 nanometers.

8. The optical component of claim 1, further comprising a temperature monitoring pad proximate to the tuning pad for monitoring a wavelength shift.

9. An optical component, comprising:
an input waveguide configured to provide input light along an input light path and positioned at a first location on a Rowland circle;
an output waveguide configured to receive reflected light along a reflected light path and positioned at a second location on the Rowland circle; and
a diffraction grating configured to:
receive light along the input light path of the input waveguide; and
reflect light along the reflected light path to the output waveguide; and
a tuning pad configured to shift a peak wavelength of a channel;
the input light is a first input light;
the input light path is the first input light path;
the input waveguide is a first input waveguide;
the optical component further comprises;
a second input waveguide configured to provide a second input light along a second input light path and positioned at a third location on the Rowland circle, the second location on the Rowland circle between the first location and the third location on the Rowland circle; and
a slab waveguide through which the first input light path, the second input light path, and the reflected light path propagate;
the reflected light path is located between the first input light path and the second input light path in the slab waveguide; and
the tuning pad is a metal pad configured to heat a portion of the slab waveguide to shift the peak wavelength of the channel.

10. The optical component of claim 9, wherein:
the first input light includes a first waveguide range of light and the second input light includes a second wavelength range of light, and the first and second wavelength ranges of light are spaced apart by at least 0.2 μm; and
the reflected light propagates in the channel in the slab waveguide.

11. The optical component of claim 10, wherein a tuning range of the channel in the slab waveguide is 50 nanometers.

12. The optical component of claim 9, wherein:
the optical component further comprises:
a first light emitting element configured to emit a second input light along a first input light path;
a second light emitting element configured to emit a second input light along a second input light path; and
a channel spacing between the first light emitting element and the second light emitting element is 50 nanometers.

13. The optical component of claim 9, wherein the tuning pad is a metal tuning pad.

14. The optical component of claim 9, further comprising the slab waveguide that comprises:
a first cladding layer;
a propagation region disposed on the first cladding layer; and
a second cladding layer disposed on the propagation region, wherein the tuning pad is disposed on the second cladding layer and configured to increase a temperature of the propagation region of the slab waveguide.

15. The optical component of claim 14, wherein a temperature change of the propagation region of the slab waveguide is in the range of 20-25 degrees Celsius.

16. The optical component of claim 9, further comprising a light path with a path length between the light receiving element and the diffraction grating, wherein:
for a constant shift in a wavelength, a change in the path length is inversely related to a shift in an index of refraction induced by the tuning pad.

* * * * *